(12) United States Patent
Ji et al.

(10) Patent No.: US 9,871,629 B2
(45) Date of Patent: Jan. 16, 2018

(54) METHOD AND APPARATUS FOR TRANSMITTING CHANNEL SOUNDING REFERENCE SIGNAL IN WIRELESS COMMUNICATION SYSTEM

(71) Applicant: Samsung Electronics Co., Ltd., Gyeonggi-do (KR)

(72) Inventors: Hyoungju Ji, Seoul (KR); Seunghoon Choi, Gyeonggi-do (KR); Younsun Kim, Gyeonggi-do (KR); Joonyoung Cho, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 296 days.

(21) Appl. No.: 14/174,425

(22) Filed: Feb. 6, 2014

(65) Prior Publication Data

US 2014/0219199 A1 Aug. 7, 2014

(30) Foreign Application Priority Data

Feb. 6, 2013 (KR) .................. 10-2013-0013399

(51) Int. Cl.
*H04L 5/00* (2006.01)
*H04W 88/08* (2009.01)

(52) U.S. Cl.
CPC .......... *H04L 5/0048* (2013.01); *H04W 88/08* (2013.01)

(58) Field of Classification Search
CPC ....................................................... H04L 5/00
USPC ........................................................ 370/329
See application file for complete search history.

(56) References Cited

U.S. PATENT DOCUMENTS

| 2010/0135273 | A1* | 6/2010 | Kim ................... H04B 1/69 370/344 |
| 2011/0292826 | A1* | 12/2011 | Ahn ................... H04W 52/16 370/252 |
| 2012/0039273 | A1 | 2/2012 | Nam et al. |

(Continued)

FOREIGN PATENT DOCUMENTS

EP    2 485 553    8/2012

OTHER PUBLICATIONS

Samsung, "SRS Multiplexing in Carrier Aggregation", R1-106018,3GPP TSG RAN WG1 #63, Nov. 15-19, 2010.

(Continued)

*Primary Examiner* — Edan Orgad
*Assistant Examiner* — Nourali Mansoury
(74) *Attorney, Agent, or Firm* — The Farrell Law Firm, P.C.

(57) ABSTRACT

Methods and apparatuses for generating a channel sounding reference signal in a wireless communication system are discussed. In one aspect, a method is provided for User Equipment (UE) in a wireless communication system to transmit a channel Sounding Reference Signal (SRS). The method includes receiving a control channel for uplink data channel transmission from a Base Station (BS); determining whether the control channel includes information for aperiodic channel SRS transmission; and when it is determined that the control channel includes information for aperiodic channel SRS transmission: transmitting uplink data through a first carrier; and transmitting the channel SRS through a second carrier; wherein the first carrier and the second carrier are transmitted simultaneously to the BS.

12 Claims, 13 Drawing Sheets

(56) References Cited

U.S. PATENT DOCUMENTS

| | | | |
|---|---|---|---|
| 2012/0163320 A1* | 6/2012 | Akimoto | H04L 5/0051 370/329 |
| 2012/0327876 A1* | 12/2012 | Ouchi | H04B 1/713 370/329 |
| 2013/0010723 A1* | 1/2013 | Ouchi | H04L 5/0048 370/329 |
| 2013/0010743 A1 | 1/2013 | Ahn et al. | |
| 2013/0034089 A1* | 2/2013 | Nakashima | H04L 5/001 370/337 |
| 2013/0039305 A1* | 2/2013 | Kishiyama | H04W 72/1263 370/329 |
| 2013/0078913 A1* | 3/2013 | Lee | H04L 5/0007 455/39 |
| 2013/0121279 A1* | 5/2013 | Noh | H04L 27/2611 370/329 |
| 2013/0195084 A1* | 8/2013 | Chen | H04W 72/0413 370/336 |
| 2013/0208690 A1* | 8/2013 | Nishikawa | H04W 48/08 370/329 |
| 2015/0036639 A1* | 2/2015 | Kwak | H04L 1/1854 370/329 |
| 2015/0237620 A1* | 8/2015 | Ouchi | H04W 72/0473 370/329 |
| 2016/0100372 A1* | 4/2016 | Dinan | H04W 52/18 370/329 |
| 2016/0233996 A1* | 8/2016 | Heo | H04L 5/001 |

OTHER PUBLICATIONS

European Search Report dated Nov. 20, 2014 issued in counterpart application No. 14154125.0-1851.

* cited by examiner

- 230 — $M_{symb}^{DL}$
- 240 — $N_{symb}^{DL} - M_{symb}^{DL}$

- DMRS
- 250 — CRS
- CCH
- PDSCH

METHOD AND APPARATUS FOR TRANSMITTING CHANNEL SOUNDING REFERENCE SIGNAL IN WIRELESS COMMUNICATION SYSTEM

PRIORITY

This application claims priority under 35 U.S.C. § 119(a) to Korean Patent Application No. 10-2013-0013399, filed in the Korean Intellectual Property Office on Feb. 6, 2013, the entire contents of which are incorporated herein by reference.

BACKGROUND OF THE INVENTION

1. Field of the Invention

The present invention relates generally to methods and apparatuses for transmitting a channel sounding reference signal in a wireless communication system, and more particularly to methods and apparatuses for providing aperiodic channel Sounding Reference Signal (SRS) transmission.

2. Description of the Related Art

In general, mobile communication systems have developed to provide communication and mobility to the user. Based on the rapid development of technology, mobile communication systems have reached a stage where high speed data communication service can be provided as well as voice communication.

Currently, standardization is progressing from the 3rd Generation Partnership Project (3GPP) system to the Long Term Evolution (LTE) system as one of the next generation mobile communication systems. The LTE system corresponds to technology which implements high speed packet-based communication having a maximum transmission rate 100 Mbps faster than the currently provided data transmission rate. LTE system standardization has been almost completed. Various new technologies are applied to recent LTE communication systems while keeping pace with the completion of LTE standardization, and discussions continue for standardizing the LTE-Advanced (LTE-A) system which will significantly improving a transmission rate. "LTE system" as used herein refers to any LTE system, and thus includes both LTE and LTE-A systems.

In an LTE system, a Base Station (BS) may make a request for transmitting reference signals for channel measurement to User Equipment (UE) in order to measure uplink channels of a plurality of UEs. Available reference signal bandwidth is limited for multiplexing channel sounding reference signals, and accordingly, the reference signal cannot be transmitted at a part of the frequency band due to resolution of the reference signal bandwidth in system having a particular bandwidth. Furthermore, in order to avoid conflicts between a channel sounding reference signal transmitted by one UE and a data channel transmitted by another UE, the BS prevents data from being transmitted on the data channels of all UEs when the channel sounding reference signal is transmitted.

When the number of UEs increases, channel measurement resource regions are saturated, and the BS is required to allocate additional resources. When this happens, the uplink capacity is reduced.

Accordingly, a communication system which guarantees reference signals for more UEs and a higher transmission rate is needed to solve the above problem. More specifically, a transmission technique which neither reduces the transmission rate of the UE nor interrupts the conventional channel sounding reference signal transmission and data channel transmission is required. Furthermore, a method for indicating the transmission technique to the UE is required as well.

SUMMARY OF THE INVENTION

The present invention provides methods and apparatuses that at least solve the above described problems and provide the advantages discussed below. According to an aspect of the present invention, when there is a lack of conventional channel sounding reference signal regions due to an increase in a number of UEs, the BS can increase channel sounding reference signal regions while not reducing data channel capacity. According to another aspect of the present invention, data channel capacity and orthogonality of the UEs within a cell are always maintained regardless of the existence of, and transmissions by, data channels of other UEs within the cell. According to still another aspect of the present invention, no substantive changes to the conventional system are required since the inventive solution does not need additional information on the control channel.

In accordance with an aspect of the present invention, a method for User Equipment (UE) in a wireless communication system to transmit a channel Sounding Reference Signal (SRS) is provided, including: receiving a control channel for uplink data channel transmission from a Base Station (BS); determining whether the control channel includes information for aperiodic channel SRS transmission; and when it is determined that the control channel includes information for aperiodic channel SRS transmission: transmitting uplink data through a first carrier; and transmitting the channel SRS through a second carrier; wherein the first carrier and the second carrier are transmitted simultaneously to the BS.

In accordance with another aspect of the present invention, a User Equipment (UE) for transmitting a channel Sounding Reference Signal (SRS) in a wireless communication system is provided, including: a transceiver configured to transmit a signal to a Base Station (BS) and to receive a signal from a BS; and a controller configured to control reception of a control channel for uplink data channel transmission from a BS, to determine whether the received control channel includes information for aperiodic channel SRS transmission, and, when the received control channel includes information for aperiodic channel SRS transmission, to control transmission of uplink data through a first carrier and a channel SRS through a second carrier, wherein the first carrier and the second carrier are transmitted simultaneously to the BS.

In accordance with yet another aspect of the present invention, a method for a Base Station (BS) to control transmission of a channel Sounding Reference Signal (SRS) from User Equipment (UE) in a wireless communication system is provided, including: generating a control channel for uplink data channel transmission of a UE; transmitting the generated control channel to the UE; when the control channel includes information for aperiodic channel SRS transmission of the UE, receiving uplink data through a first carrier and a channel SRS through a second carrier, the first carrier and the second carrier being transmitted simultaneously by the UE; and measuring a channel state by using the received channel SRS.

In accordance with still another aspect of the present invention, a Base Station (BS) for controlling transmission of a channel Sounding Reference Signal (SRS) from User Equipment (UE) in a wireless communication system is provided, including: a transceiver configured to transmit a signal to a UE and to receive a signal from a UE; and a controller configured to control generation of a control channel for uplink data channel transmission of a UE, transmission of the generated control channel to the UE, when the transmitted control channel includes information for aperiodic channel SRS transmission of the UE, reception from the UE of uplink data through a first carrier and the channel SRS through a second carrier, and measurement of a channel state by using the received channel SRS, wherein the first carrier and the second carrier are transmitted simultaneously by the UE.

BRIEF DESCRIPTION OF THE DRAWINGS

The above and other aspects, features and advantages of the present invention will be more apparent from the following detailed description in conjunction with the accompanying drawings, in which.

DETAILED DESCRIPTION OF EMBODIMENTS OF THE PRESENT INVENTION

Figure 1:
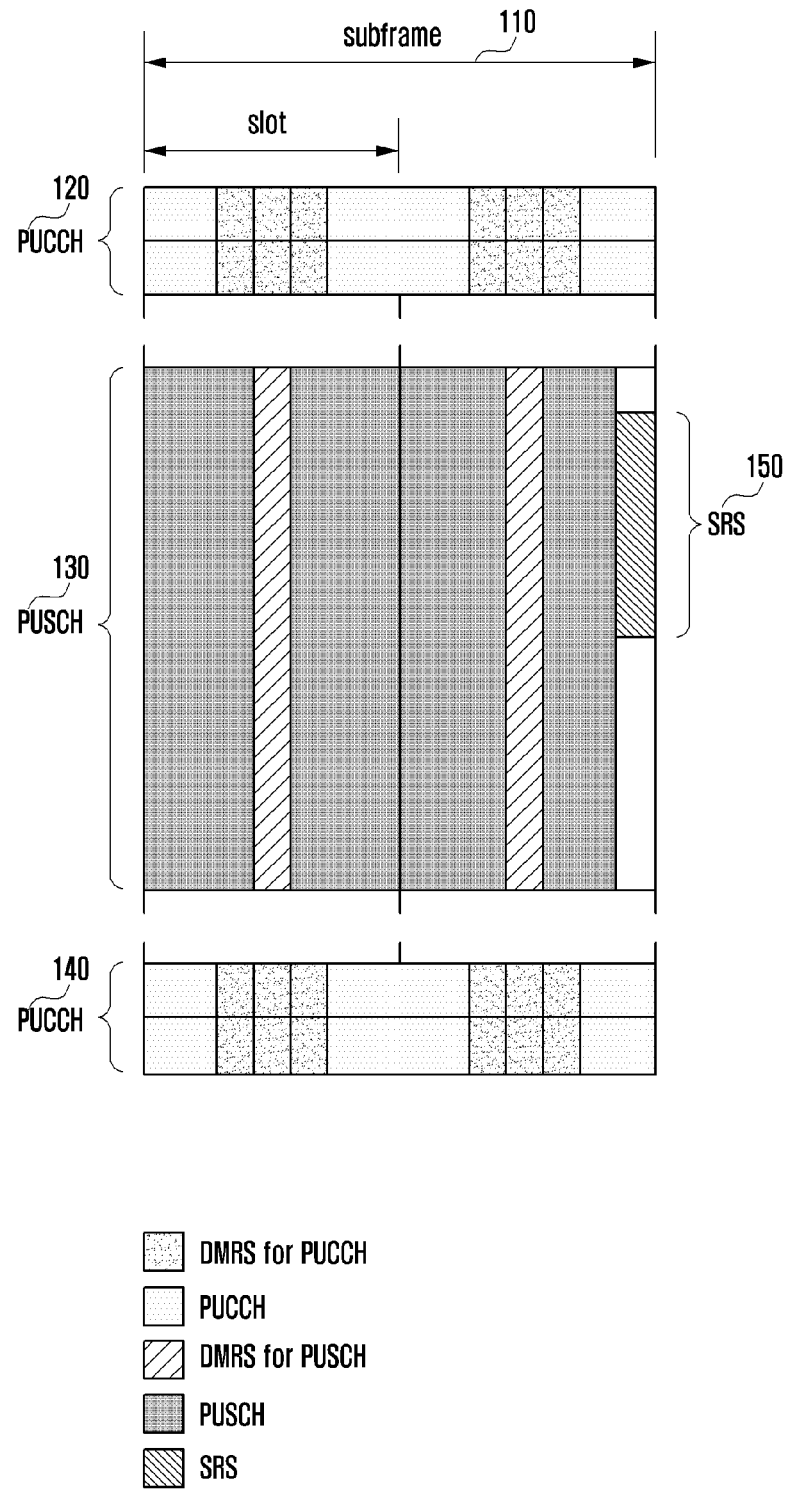
FIG. 1 illustrates a structure of an uplink subframe of an LTE system to which embodiments of the present invention are applied.

In the following description of the present invention, a detailed description of known configurations or functions herein will be omitted when it is determined that the detailed description may make the subject matter of the present invention unclear. Hereinafter, embodiments of the present invention will be described with reference to the accompanying drawings.

The present invention is for a communication system in which a BS transmits a downlink signal to a UE and the UE transmits an uplink signal to the BS. The downlink signal includes a data channel, a control channel transmitting a control signal, and a Reference Signal (RS) for channel measurement and channel feedback included in a report transmitted to the UE.

More specifically, in one embodiment, a UE receives a configuration of channel sounding reference signal transmission from a BS by higher layer signaling and performs transmission through an uplink scheduling control channel by using two carriers. One carrier is used for transmitting a data channel and the other carrier is used for transmission for channel measurement. Further, time symbols transmitting reference signals of the respective carriers may be equally configured. Furthermore, for the reference signal transmission, the two carriers are allocated different cyclic shift resources which do not include "0". The transmission power used for a reference signal for data channel demodulation on one carrier and the transmission power used for a reference signal for the channel measurement on the other carrier are the same when the transmission power per time is sufficient. However, when the transmission power per time is not sufficient, power is first allocated to the data demodulation reference signal transmitted on the first carrier and then power is allocated to the channel measurement reference signal transmitted on the second carrier.

When a reference signal on the data channel is transmitted in one carrier by using two or more antennas in a multi-antenna transmission scheme, the reference signal is transmitted using antenna precoding as instructed through a control channel while the reference signal for the channel measurement is transmitted using the same number of antennas as the number of data channels. However, the transmission may be made using unitary precoding instead of antenna precoding on the control channel. Unitary precoding refers to a method of pre-processing a transmission signal by using a unitary matrix. The UE may transmit the channel sounding reference signal by hopping between slots of one carrier.

In another embodiment of the present invention, the UE transmits a channel sounding reference signal on an edge of an uplink band through one PRB (i.e., a pair of slots having one resource block). The transmitted PRB is hopped during transmission according to the location of the control channel, and hopping between slots is also supported.

Furthermore, embodiments of the present invention remove the limit on bandwidth for multiplexing between the conventional channel SRS and a channel SRS of another UE.

In embodiments of the present invention where the UE uses two uplink bands (in a case where there is a Pcell and an Scell) and the Pcell uses inter-band scheduling, the UE receives a configuration of channel sounding reference signal transmission from the BS by higher layer signaling. With respect to uplink resources mapped to control channel resource indexes where the corresponding control channel is transmitted according to a scheduling control channel transmitted by the BS, the UE transmits an uplink response channel for the corresponding resource in one band and transmits the channel sounding reference signal for the corresponding resource in another band.

In still another embodiment of the present invention, the UE receives a configuration of channel sounding reference signal transmission from the BS by higher layer signaling and performs transmission to one band by using one carrier through an uplink control channel using scheduling transmitted by the BS. In this event, only a scheduled data symbol is transmitted at a time when a data symbol is transmitted and a channel sounding reference signal is simultaneously transmitted at a time when a reference signal of a data channel is transmitted. At this time, the data reference signal and the channel sounding reference signal are located on successive frequencies. When the frequencies of the signals are successively located, a reference signal sequence according to each bandwidth should be used, and such a characteristic is maintained even when there is transmission hopping between slots.

Although the following description discusses a Sounding Reference Signal (SRS) as a reference signal for measuring a channel, the present invention is not limited thereto. As described below, a reference signal for measuring a downlink channel may include a Cell-specific RS (CRS), a Channel Status Information RS (CSI-RS), and the like, and a reference signal for measuring an uplink channel may include an SRS. Hereinafter, although embodiments of the present invention will be described with the SRS as the reference signal for measuring the channel, the same principle may be applied to the CRS, the CSI-RS, and the like, as well as the SRS.

The BS transmits data information and control information to the UE through a Physical Downlink Shared CHannel (PDSCH) and a DownLink Control CHannel (DLCCH), respectively.

The uplink includes a data channel, a control channel, and a reference signal which the UE transmits to the BS, where the data channel is transmitted through a Physical Uplink Shared CHannel (PUSCH) and the control channel is transmitted through a Physical Uplink Control CHannel (PUCCH).

The BS may have a plurality of Reference Signals (RSs), such as a Common Reference Signal (CRS), a Channel State Information RS (CSI-RS), and a demodulation reference signal of a specific UE (i.e., a DeModulation Reference Signal or DMRS).

The CRS is transmitted over all downlink bandwidths and is used when all UEs within a cell demodulate signals and measure channels. In order to reduce resources used for CRS transmission, the BS transmits the DMRS only to regions scheduled for the UE-specific RS and transmits the CSI-RS on time and frequency axes to acquire channel information for the DMRS.

The UE transmits the data channel (PUSCH) and the control channel (PUCCH) by using the DMRS and may also transmit a Sounding Reference Signal (SRS) for measuring an uplink channel. The SRS is transmitted as the last symbol of a subframe and cannot be transmitted simultaneously with the PUSCH and the PUCCH. In general, when the PUCCH is transmitted at an edge of the uplink bandwidth, the PUSCH may be transmitted over the full bandwidth.

FIG. 1 illustrates an uplink subframe.

The UE uses an uplink subframe 110 as a basic transmission time unit and one uplink subframe 110 consists of two slots. The subframe consists of a total of $N_{symb}^{DL}$ symbols, and the UE transmits the control channel, the data channel, the reference signal and the like using symbols.

Control channels (PUCCH) 120 and 140 are transmitted at the edges of the uplink subframe on the frequency axis, and one PUCCH is alternately transmitted in slots at both the uplink edges.

A data channel (PUSCH) 130 may be transmitted over one full uplink band or over two successive bands at maximum.

Each of the control channel and the data channel allocate the RS (DMRS) to a part of the symbols in an allocation region as illustrated in FIG. 1, so that the BS can demodulate the signal transmitted by the UE. The SRS is transmitted at the last symbol of the subframe 110 as indicated by a reference numeral 150. At this time, data is not transmitted at the last symbol where the SRS is transmitted.

Figure 2:
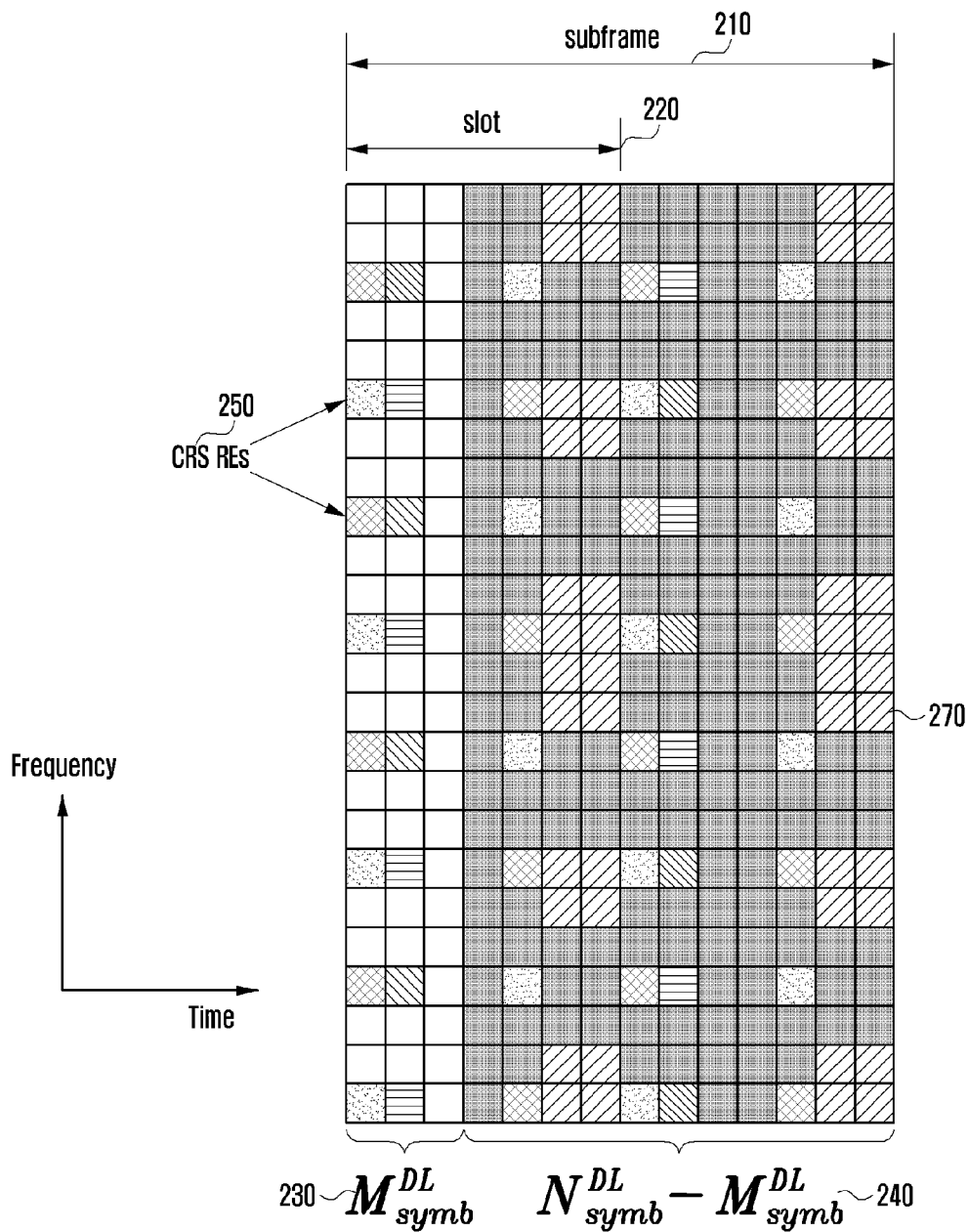
FIG. 2 illustrates a process of configuring a downlink subframe of the LTE system to which embodiments of the present invention are applied.

FIG. 2 illustrates a downlink subframe.

Referring to FIG. 2, a scheduling unit of the BS is a downlink subframe 210, and one subframe 210 consists of two slots 220 corresponding to a total of $N_{symb}^{DL}$: symbols to transmit a control channel, a data channel, a reference signal and the like.

Among the $N_{symb}^{DL}$: symbols, $M_{symb}^{DL}$ symbols are used for transmitting a control channel 230 at the beginning of the subframe and the remaining symbols $N_{symb}^{DL}$-$M_{symb}^{DL}$ are used for transmitting the data channel 240.

The frequency bandwidth is mapped by Resource Blocks (RBs). Each of the RBs consists of a total of $N_{sc}^{RB}$ subcarriers or Resource Elements (REs) and a unit including two slots on the time axis and one RB is referred to as a PRB pair.

The uplink of FIG. 1 and the downlink of FIG. 2 use the same transmission unit. A CRS 250, a CSI-RS, and a DMRS 270 are transmitted through a PRB pair.

In order to measure a downlink channel, the BS transmits the CRS or the CSI-RS to allow the UE to perform the channel measurement. When the UE reports a result of the channel measurement to the BS, the BS can determine a downlink channel state between the BS and the UE.

In contrast, uplink channel measurement is performed when the BS instructs the UE to transmit the SRS. Specifically, the BS can determine the uplink channel state by receiving the SRS transmitted by the UE.

Since a Frequency Division Duplex (FDD) system has different frequency bands used for the uplink and the downlink, even though the UE measures the downlink channel and transmits a result thereof to the BS, SRS transmission is required to perform uplink channel measurement. In a Time Division Duplex (TDD) system in which the downlink frequency band and the uplink frequency band are the same, the SRS transmission is still very important since uplink SRS channel information can be used without feedback from the downlink channel measurement.

SRS uplink transmission requires the consideration of several matters for multiplexing with another channel. When a subframe where the UE does not transmit the SRS corresponds to a subframe where another UE transmits the SRS, data channels of all UEs do not transmit the last symbol in the corresponding subframe to prevent a conflict of the SRSs. This is determined by providing SRS configuration information configured for each BS.

In transmission of the SRS and the control channel (PUCCH), when one UE is scheduled to simultaneously transmit the PUCCH and the SRS, the SRS is not transmitted since information of the PUCCH is more important.

When the BS configures the UE to use a scheme in which the last symbol is not transmitted among the PUCCH transmission method of the UE, all UEs do not use the last symbol for both the PUCCH and the PUSCH, so that the SRS can be transmitted via the last symbol.

Accordingly, in order to guarantee the uplink SRS transmission, a format in which the last symbol is not used should be utilized for the control channel. However, this causes deterioration of the reception capability of the control channel and coverage reduction. Also, since the data channel cannot use the last symbol all the time, whole cell uplink data channel capability is reduced by about 8.3%.

Further, since the SRS is transmitted to the same SRS symbol by another UE, orthogonality should be guaranteed to make the BS distinguish between the respective SRSs, and accordingly, the setting of the SRS transmission bandwidth varies depending on each UE.

The bandwidth where the SRSs are transmitted is set to be smaller than the full uplink bandwidth. By such a setting of the bandwidth, the SRSs cannot use the full uplink bandwidth, which corresponds to an additional disadvantage. For example, when the uplink bandwidth consists of 50 frequency resources, the SRS transmission bandwidth may be set to have 4 frequency bands for multiplexing between different UEs, and thus, a total of 12 SRS transmission bandwidths are created. In this case, the 12 transmission areas correspond to a total of 48 frequency resources, and accordingly, 2 frequency resources of the 50 frequency resources are not used.

Accordingly, when the SRS is configured to perform uplink channel measurement, the BS has a limit on SRS capacity. When additional SRS resources are allocated, the capacity of the whole cell deteriorates. Further, due to an influence of the SRS bandwidth, in other words, since the SRS bandwidth cannot be changed, all the channels of the full uplink bandwidth cannot be measured.

Figure 3:
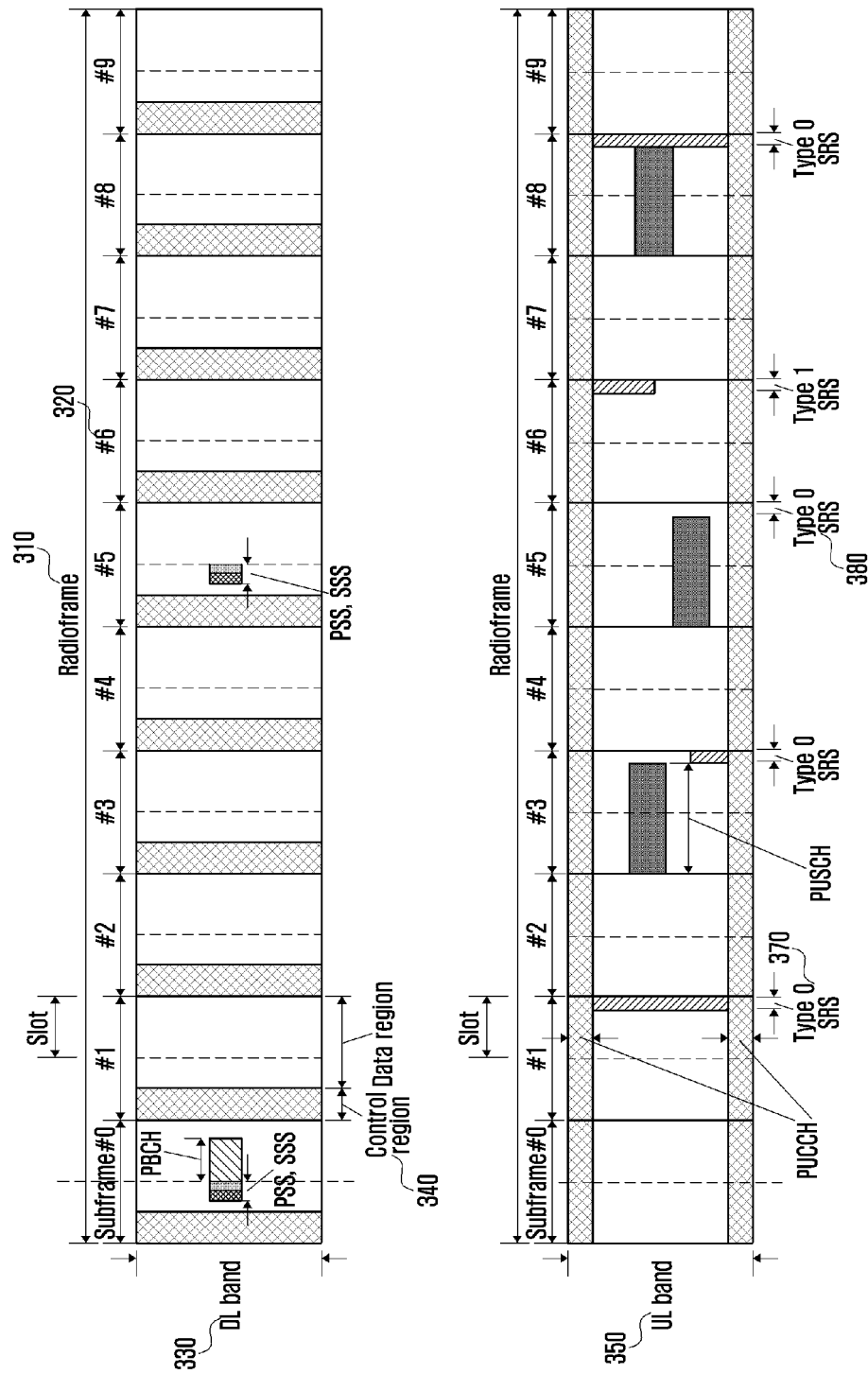
FIG. 3 illustrates a method of transmitting an SRS of the LTE system to which embodiments of the present invention are applied.

FIG. 3 illustrates SRS transmission in the wireless communication system from a viewpoint of the resources.

Referring to FIG. 3, the SRS largely has two transmission modes. One transmission mode corresponds to periodic transmission and the other transmission mode corresponds to aperiodic transmission.

In the periodic transmission, UEs within all cells transmit SRSs at predetermined resource times and SRS bands allocated to the UEs, which corresponds to type 0 transmission.

In contrast, in the aperiodic transmission, when a channel of a particular UE of the UEs within the cells is required, the BS makes a setting such that the UE transmits the SRS once by using particular information of the downlink control channel, which corresponds to type 1 transmission.

In type 0, when the BS transmits configuration information of type 0 by higher layer signaling, the UE continuously performs transmission until the BS reconfigures the configuration information of type 0. In type 1, the BS transmits configuration information of the aperiodic transmission. However, in actual transmission, the BS inserts transmission information into the downlink control channel and transmits the downlink control channel to the UE, so as to instruct the UE to transmit the SRS.

FIG. 3 illustrates temporally successive subframes transmitted in a downlink band 330 and temporally successive subframes transmitted in an uplink band 350.

One radio frame 310 consists of a plurality of successive subframes as indicated by a reference numeral 320. When odd-numbered subframes of the uplink band 350 are configured for type 0 SRS transmission, the UE transmits the type 0 SRS based on SRS transmission bands 370 and 380 through the corresponding transmission subframes. Since a Physical Broadcast CHannel (PBCH), a Primary Synchronization Signal (PSS), and a Secondary Synchronization Signal (SSS) illustrated in FIG. 3 correspond to already known techniques, descriptions thereof will be omitted.

In contrast, in type 1, the BS gives an SRS transmission command to the UE by using downlink scheduling information or uplink scheduling information included in the downlink control channel 340.

When the UE receives the control channel at the downlink control channel 340 in the subframes of downlink band 330, the UE may identify whether the SRS transmission command is included.

When the UE receives the SRS transmission command of type 1 in the downlink scheduling information included in the downlink control channel at an nth subframe, the UE waits for a subframe where the SRS transmission of type 1 is possible after an n+4 subframe among the uplink subframes and then performs transmission. However, when there is the SRS transmission command of type 1 in the uplink scheduling information included in the downlink control channel, since the n+4 uplink subframe is configured to enable the SRS transmission of type 1, the SRS transmission is performed at the corresponding subframe.

When transmission commands of type 0 and type 1 simultaneously exist, the UE follows the command of type 1. As described above, there is the disadvantage in which the SRS should be transmitted only at a particular subframe on the time axis, data channel regions are reduced by the SRS transmission, and the SRS transmission bandwidth cannot be dynamically changed.

The UE may measure a channel by transmitting the UE-specific reference signal, such as the DMRS, which causes a disadvantage because a particular period and a particular bandwidth should be configured in advance, like in type 0 (but, there is an effect of increasing capacity for sounding).

In order to compensate for the disadvantage, a method of scheduling the SRS for the sounding in the same way as the data channel may be used.

However, in such a method, the scheduling of the SRS is controlled in the same way as the scheduling of the data channel, i.e., by using the downlink control channel. Thus, capacity of the control channel used for the actual data channel increases as the DMRS transmission for the sounding increases and actual efficiency deteriorates.

Accordingly, the embodiments of the present invention described below provide a DMRS transmission method based on SRS transmission of type 1 without waste or an increase of the control channel.

According to the embodiments of the present invention, the BS includes configurations of two types of type 1. One type corresponds to type 1 transmission using the SRS and is hereinafter referred to as type 1a. The other type corresponds to SRS transmission based on (using) the DMRS and is hereinafter referred to as type 1b.

The embodiments of the present invention provide a method in which the UE transmits the RS, that is, performs SRS transmission of type 1a and type 1b based on a dynamically instructed command, without an increase or a waste of the control channel capacity.

The provided method has the characteristic that the RSs for the data channel and the sounding are simultaneously transmitted using different carriers on the uplink frequency band.

Figure 4:
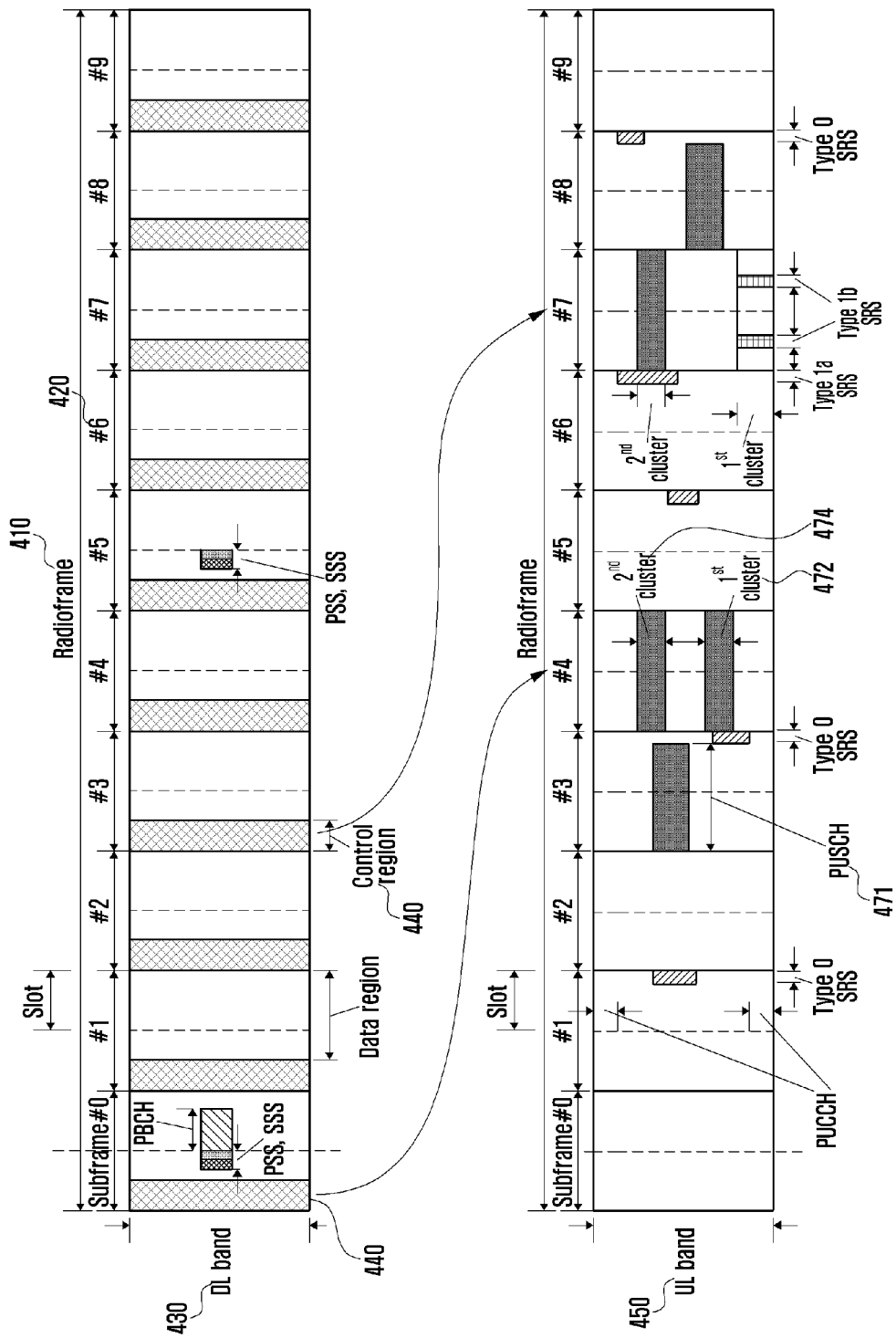
FIG. 4 illustrates a method of transmitting a channel SRS according to a first embodiment of the present invention.

FIG. 4 illustrates a method of transmitting an RS for measuring a channel according to a first embodiment provided by the present invention. The first embodiment provides a method of controlling RS transmission for measuring a channel by using information on a control channel for transmitting an uplink data channel.

Under a control channel information configuration provided by the first embodiment, two carriers (a first carrier and a second carrier) are scheduled on one uplink band. One carrier (hereinafter referred to as the first carrier) of the two carriers is used for transmitting uplink data and the other carrier (hereinafter referred to as the second carrier) is used for transmitting the DMRS for the sounding. The two carriers are simultaneously transmitted and such a simultaneous transmission corresponds to the type 1b transmission.

Referring to FIG. 4, the conventional uplink data channel is scheduled on the UE through a control channel 440 of a downlink band 430. Information on the control channel 440 includes resource allocation information of carriers which can be used in the uplink.

When the UE recognizes resource allocation information of the UE itself through the control channel 440, the UE may transmit the data channels to scheduled frequency resource regions by determining whether the data channels are transmitted using one carrier 471 or using two carriers 472 and 474.

When the conventional type 0 SRS transmission or type 1a SRS transmission is used, the last symbol of the data channel cannot be used for the data transmission. Accordingly, in order to prevent the data capacity reduction and the SRS transmission resource increase, the channel SRS based on the DMRS is transmitted. In this event, control channels scheduled like the data channels are required to schedule the channel SRSs, thereby reducing control channel capacity.

Accordingly, the first embodiment provided by the present invention suggests a method of dynamically instructing the UE to use a predetermined carrier for the data transmission or only for the transmission of the RS for the sounding in the (downlink) control channel which can instruct the data transmission using two carriers.

The first embodiment of the present invention does not reduce the capacity of the data channels and also does not reduce the data channel bandwidth since even though one of the two carriers is not used for the data channel, the bandwidth of the remaining carrier can be increased through scheduling. Further, the BS may still use the method of indicating conventional type 0 and type 1a transmission according to the first embodiment of the present invention and also indicate type 1b transmission. In addition, compared to the conventional SRS transmission, the bandwidth for the sounding can be dynamically controlled, so that the required channels can be more accurately recognized.

Figure 5:
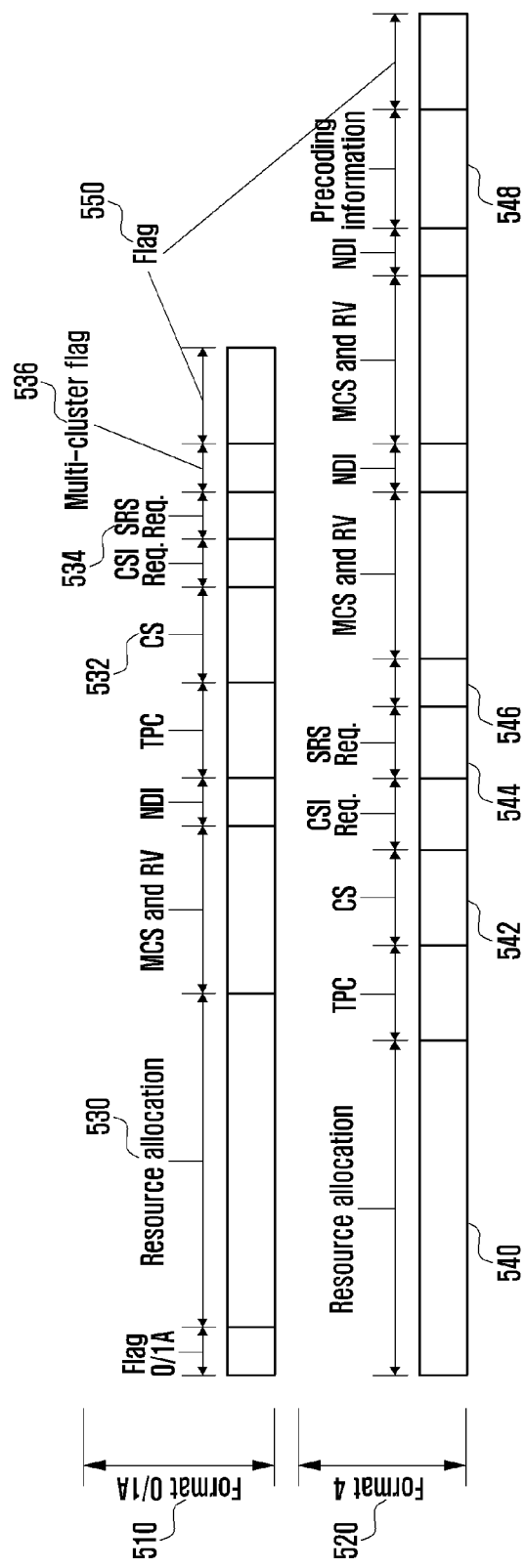
FIG. 5 illustrates a structure of a control channel for transmitting the channel SRS according to the first embodiment of the present invention.

FIG. 5 illustrates a method of configuring an uplink control channel for transmitting a reference signal for measuring a channel according to the first embodiment of the present invention.

FIG. 5 shows a control channel for uplink data channel scheduling. The UE may recognize a plurality of control channel formats. Among the plurality of control channel formats, there are two control channel formats for the uplink data channel transmission and the two control channel formats correspond to format #0/1A 510 and format #4 520.

There is a large difference between the two formats, as format #0/1A 510 is a format which does not support MIMO and format #4 520 is a format which does support MIMO. Basically, the two control channels include resource allocation information of the data channel and information on a transmission format of a transmitted transport block.

In format #4 520, scheduling information on a maximum of two transport blocks and MIMO precoding/precoder information are added for MIMO transmission.

In both formats, information on whether the UE uses one carrier or two carriers in data transmission is indicated through multi-cluster flags 536 and 546 and a method of interpreting resource allocation regions 530 and 540 varies depending on the indication.

In order to allow the BS to correctly receive the data channel, code resources used for the DMRS transmitted together with the data channel are indicated by Cyclic Shift (CS) indicators 532 and 542. The corresponding indicators inform of code resource information used for the DMRS. When different UEs transmit data channels through the same resource region, the BS may distinguish the channels of the respective UEs by using the code resources guaranteeing orthogonality through the code resource information.

Further, in the SRS transmission, the type 0 transmission corresponds to the periodic transmission, so that the UE starts transmission when receiving the configuration information of type 0 from a higher layer without direct instruction from the control channel. The SRS transmission which can be indicated by the control channel corresponds to type 1a transmission. A 1-bit indicator 534 is used in format #0/1A, and a 2-bit indicator 544 is used in format #4 520. When values of SRS Req. 534 and 544 are set as particular values, the BS instructs the UE to transmit the SRS. In format #0/1A 510 using the 1 bit, the SRS transmission of type 1a configured according to an indicator's command is performed. In format #4 520, the BS may provide instructions for a total of four configurations for the transmission of type 1a and the respective configurations may have different transmission bandwidths and resources. Accordingly, based on an interpretation of the corresponding indicator 544, the type 1a transmission may be selectively performed.

When the type 1b transmission is indicated using the conventional control channel format, the following methods are used.

A first method of indicating the type 1b transmission by using the conventional control channel format interprets the control channel by using configuration information of type 1b. When the UE is configured to enable the type 1b SRS transmission, the UE recognizes control channel resource allocations 530 and 540 as resource allocations using two carriers according to the existence or nonexistence of multi-cluster indications by multi-cluster indicators 536 and 546. In this circumstance, when SRS transmission 534 or 544 is triggered, the type 1b transmission is determined.

In contrast, the type 1a transmission is performed when the SRS transmission 534 or 544 is triggered when the transmission does not correspond to multi-cluster transmission.

Format #0/1A 510 will be used as an example. When the UE distinguishes resource allocation methods according to an indicator of a multi-cluster flag 536 of the control channel, the UE recognizes type 1b transmission when the multi-cluster flag is "1", indicating the use of two carriers, and SRS transmission 534 "1". In contrast, the UE recognizes type 1a transmission when the multi-cluster flag is "0" and the SRS transmission 534 is "1".

When the multi-cluster flag is set, the resource allocation information 530 and 540 indicates a PRB region for two successive carriers. When it is indicated that actual data transmission and type 1b transmission are simultaneously generated, a method of identifying a carrier having a lower frequency or a carrier having a higher frequency to be used for the type 1b transmission or of informing, using higher layer signaling, which carrier is used for the type 1b transmission may be used.

In format #4 520, where an indicator 544 for triggering the SRS transmission is configured by 2 bits, when the multi-cluster flag is "1", the type 1b transmission is not performed if the 2 bits of the SRS transmission indicator 544 are "00", a low cluster is used for the SRS transmission and a high cluster is used for the data transmission if the 2 bits are "01", the low cluster is used for the data transmission and the high cluster is used for the SRS transmission if the 2 bits are "10", and neither cluster is used or both clusters are used for the SRS transmission if the 2 bits are "11". Furthermore, when the multi-cluster flag is "0", the 2 bits of the SRS transmission 544 are used for the conventional type 1a transmission.

In another embodiment, the type 1b transmission is performed only when the multi-cluster flag is "1" and the 2 bits of the SRS transmission indicator 544 are "11", and the remaining bit fields are used for the conventional type 1a transmission. In this embodiment, information on which cluster is used for the SRS transmission follows the predefined rule or the higher layer signaling as described above.

A second method of indicating type 1b transmission to the UE by using the conventional control channel format uses an additional indicator within the control channel.

In a comparison between the downlink control channel of the UE and the uplink control channel, there is a 2-bit flag used only for the downlink control channel and the flag may be transmitted together with the conventional control channel and indicated in the uplink as indicated by a reference numeral 550.

In format #0/1A 510, since the downlink control channel and the uplink control channel use the same format, when the uplink uses regions which are used by the downlink, it does not cause capacity limitation. Furthermore, in format #4 520 corresponding to the format only for the uplink, the UE maintains the control channel reception capability like before, even though information on the control channel increases since the format is the format used for uplink MIMO transmission.

One method using additional flag 550 adds one bit, while another method for using additional flag 550 adds 2 bits.

In the method adding 1 bit, when the multi-cluster flag is "1" and the SRS transmission indicators 534 and 544 are "1" in format #0/1A 510 and format #4 520, respectively, the type 1b transmission is indicated and the additional 1 bit 550 is used for determining which cluster is used for the SRS transmission and thus does not transmit the data channel.

In the method adding 2 bits, when the multi-cluster flag is "1", and the SRS transmission indicators 534 and 544 are "1" in format #0/1A 510 and format #4 520, respectively, the type 1a transmission is indicated if the additional 2-bit flag 550 is "00", the low cluster is used for the SRS transmission and the high cluster is used for the data transmission if the 2-bit flag 550 is "01", the low cluster is used for the data transmission and the high cluster is used for the SRS transmission (or vice versa) if the 2-bit flag 550 is "10", and neither cluster is used or both clusters are used for the SRS transmission if the 2-bit flag 550 is "11".

The control channel scheduling the uplink data channel may indicate channel resource information of the DMRS used for the data channel through Cyclic Shift (CS) 532 or 542. The indicated value corresponds to a cyclic shift value used for a sequence of the DMSR. Since sequences using different cyclic shift values do not cause interference even though they are simultaneously transmitted and received, channel estimation and measurement are possible.

In the data channel, when the multi-cluster flag 436/546 is transmitted, the DMRS used for the transmission exists over two different clusters but the cyclic shift values actually used are the same. However, in a case of the present invention using a predetermined cluster for the type 1b transmission, not for the data transmission, when the cyclic shift is used, it is difficult to avoid a conflict with the cyclic shift scheduling of another UE. This is particularly because data transmitted by Semi-Persistence Scheduling (SPS) generally uses 0 as the cyclic shift value.

Accordingly, in embodiments of the present invention, a value of the Cyclic Shift (CS) 532 or 542 is used only for the actual data channel and a value different from the value of CS 532 or 542 is used for the DMRS for the channel measurement, where the different value is not 0. The value may be configured by an offset of the value indicated by CS 532 or 542 through higher layer signaling or may indicate the actual cyclic shift value.

Further, when the actual data transmission corresponds to the MIMO transmission and thus two or more DMRSs are simultaneously transmitted through the same resource, the same number of DMRSs for the channel measurement as a number of DMRSs used for the data transmission is also transmitted through the same resource. In this circumstance, a used cyclic shift value is indicated by higher layer signaling or an offset value of the indicated value is indicated by a higher layer, so that a conflict between different UEs can be prevented.

In addition, in MIMO transmission according to conventional systems, the BS transmits precoder/precoding information 548 used for transmitting a plurality of DMRSs to the UE through the control channel 520. Using the received precoding information 548, the UE pre-processes data symbols and then transmits the corresponding data channel. However, in this circumstance, the same number of DMRSs used for the type 1b transmission as a number of DMRSs used for the data transmission is transmitted through the same resource, but a unitary precoder, not the indicated precoder, may be used. When the channel is transmitted for the channel measurement by using the indicated precoder in the same way as the data channel, the BS measures the precoded channel. In this circumstance, the BS measures a change channel by the precoder instead of an actual channel of the UE. Accordingly, the measurement of the channel has no meaning and is different from estimated channel information using the conventional SRS, so that the measurement is not reflected in the scheduling.

By contrast, in embodiments of the present invention, the precoding information of the control channel is used for the data channel but is not used for the type 1b transmission. Further, in a case of transmission power, since the data channel and the SRS are time division multiplexed, all transmission power of the UE could be used for the SRS transmission.

However, in embodiments of the present invention, the RS for the channel measurement and the data channel are frequency division multiplexed. Accordingly, the transmission power of the UE is shared temporally between the DMRS used for the data channel and the DMRS used for the channel measurement. When actual data symbols are transmitted on the data channel, nothing is transmitted on the cluster for the channel measurement, so that there is no problem with the transmission power, thus the problem occurs only in the symbol where the DMRS is transmitted.

Accordingly, the present invention provides the following method as a method of controlling power for transmitting the channel SRS.

First, when a sum of power used for the DMRS transmission for the channel measurement and power used for the DMRS transmission for the data channel is smaller than maximum transmission power of the UE, an equal amount of power is allocated to each of the two DMRSs and the same amount of power is used for the data channel.

When the sum of power used for the DMRS transmission for the channel measurement and power used for the DMRS transmission for the data channel is larger than the maximum transmission power of the UE, power is first allocated for the DMRS used for the data channel and then power is allocated for the DMRS used for the channel measurement (and reduced as necessary). In the data channel, the same power as the power for the DMRS for the data channel is applied to the data symbol.

The BS according to the first embodiment of the present invention transmits configuration information of type 1b SRS transmission to the UE enabling the type 1b SRS transmission to perform aperiodic uplink channel measurement by higher layer signaling. Further, the BS makes simultaneous transmission possible by frequency division multiplexing the data channel and the channel SRS.

The first embodiment of the present invention does not influence and/or otherwise interfere with the conventional SRS transmission resources and does not reduce the SRS resources or the data channel capacity generated by the SRS transmission.

Further, since there is no interference with other UEs, multiplexing is easy, and the BS may measure the channel of the uplink bandwidth where the conventional SRS transmission cannot be performed and dynamically determine the band for the channel measurement. In addition, additional resources are not required to indicate the type of transmission and the BS may determine whether to perform transmission by using the control channel of the UE without higher layer signaling as necessary.

Figure 6:
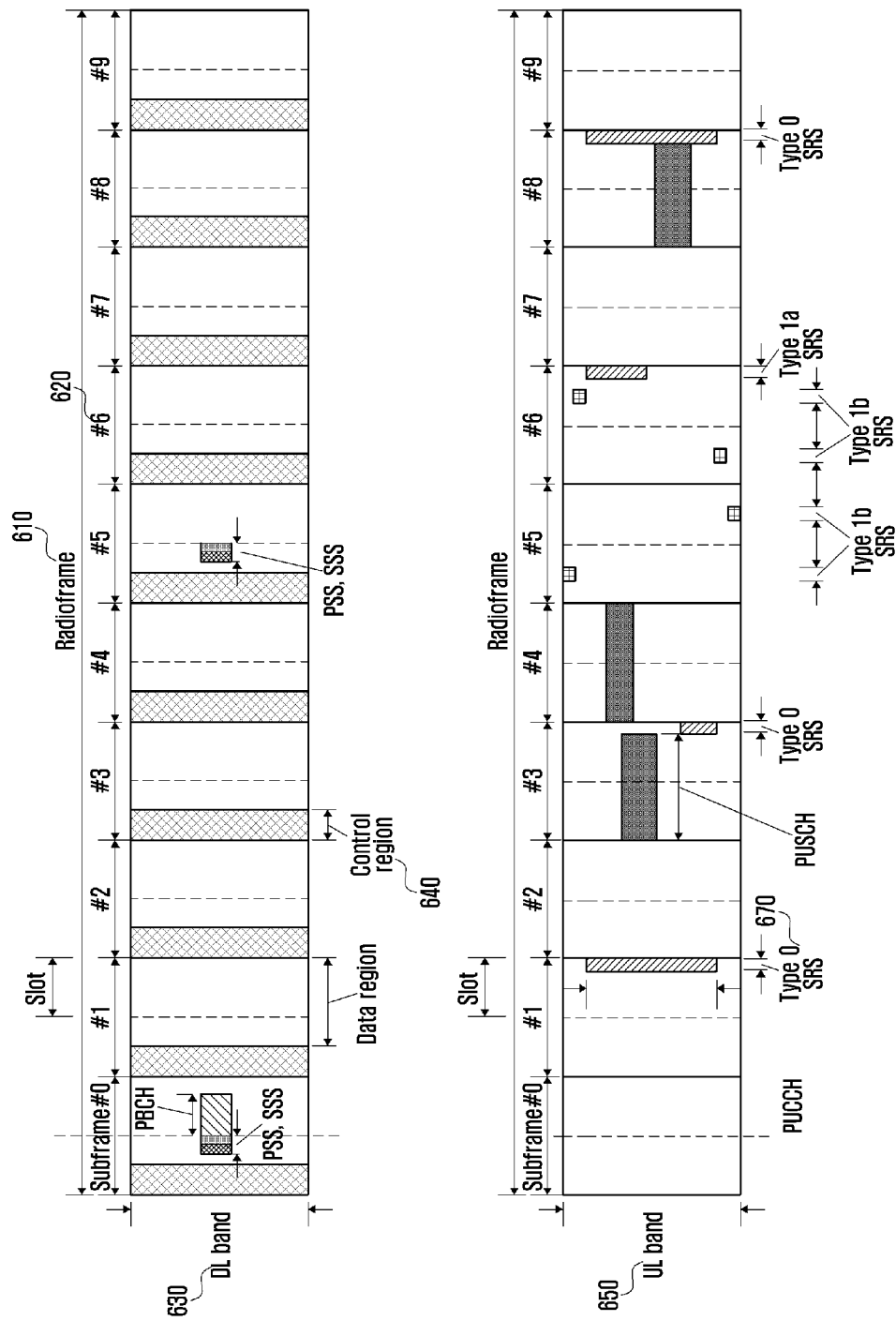
FIG. 6 illustrates a method of transmitting a channel SRS according to a second embodiment of the present invention.

FIG. 6 illustrates a method of transmitting an RS for measuring a channel according to a second embodiment provided by the present invention. A technology provided by the second embodiment of the present invention corresponds to a type 1b transmission method using location information of the control channel.

The following description will be made with reference to FIG. 6.

As illustrated in FIG. 6, a radio frame 610 consists of successive subframes 620. When a downlink transmission band 630 and an uplink transmission band 650 exist together, a location of type 1b transmission is determined by a logical location of the control channel which the BS transmits to the UE and a length of the bandwidth of the type 1b transmission is determined by a control channel amount of the control channel.

The BS transmits the control channel to the UE by using a logical Control Channel Element (CCE) and may configure the control channel by using 1, 2, 4, 8, 16, or 32 successive CCEs according to a channel state of the UE.

Transmitting the control channel to the UE by using a plurality of CCEs means that the channel state of the UE is not good, and accordingly, more resources are used to transmit the control channel at a lower transmission rate.

Further, in transmitting the control channel to a plurality of UEs, the BS allocates different CCE regions to respective subframes by using a predetermined transmission pattern in order to prevent a conflict of the control channel region between the UEs. Accordingly, from the viewpoint of one UE, the UE searches for control channels allocated to itself in CCEs of different regions for respective subframes and recognizes by itself how many CCEs are used for the transmission.

In the second embodiment of the present invention, the UE derives a position of the resource for the type 1b transmission of the UE by using a lowest CCE of the control channel recognized by the UE and a transmission bandwidth of type 1b SRS transmission is transmitted in inverse proportion to a number of successively used CCEs.

A large number of used CCEs means that the channel state of the UE is not good, and accordingly, the UE uses more power. When the UE uses a large bandwidth for the type 1b transmission, more power is consumed and thus power per unit frequency is reduced, so that the BS has difficulty in performing the channel measurement.

Figure 7:
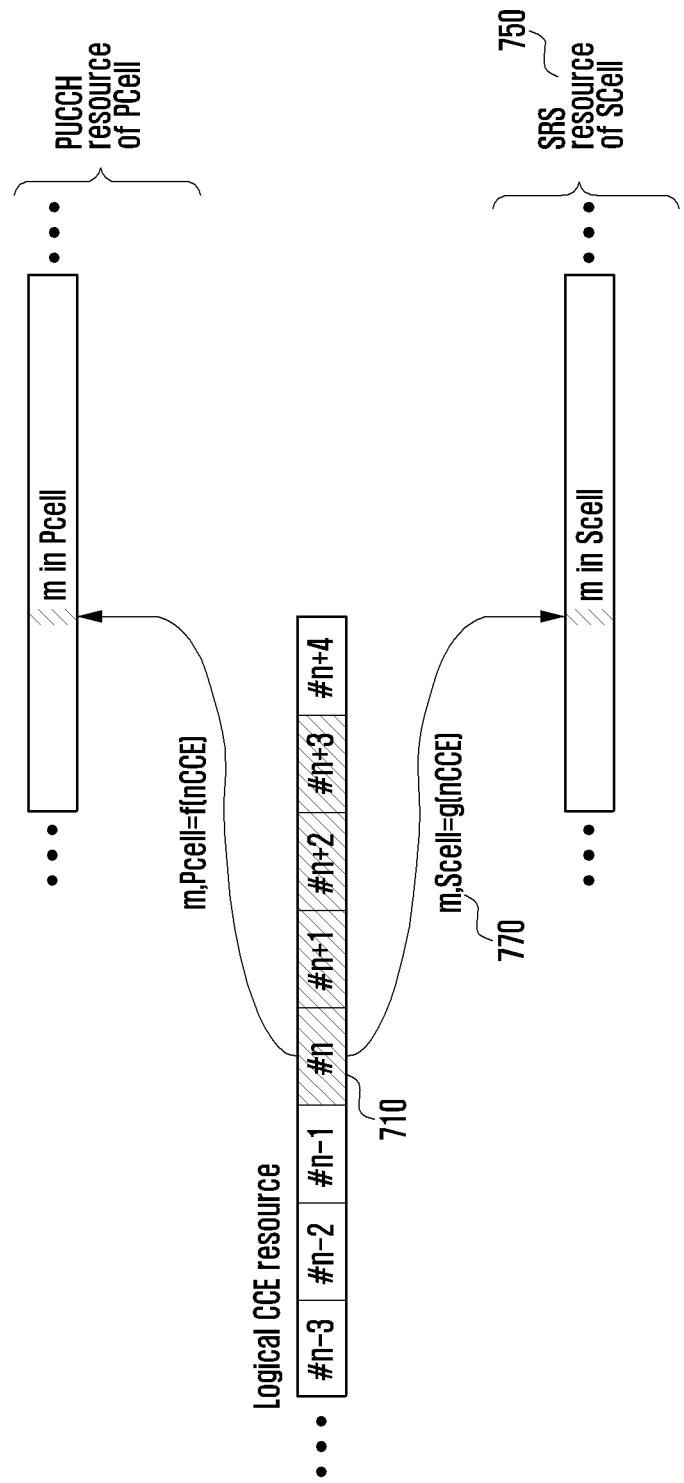
FIG. 7 illustrates a method of determining resources for transmitting the channel SRS according to the second embodiment of the present invention.

FIG. 7 illustrates a relation between reference signal transmission for the channel measurement and control channel resource allocation according to the second embodiment provided by the present invention.

Referring to FIG. 7, reference numeral 710 indicates locations of CCEs and refers to transmission of the control channel using L successive CCEs based on a predetermined UE. After the UE recognizes the control channel, the UE configures a location indicating a transmission start point of the type 1b transmission and a bandwidth as described above as indicated by reference numeral 770 and performs the type 1b transmission on the uplink bandwidth as indicated by reference numeral 750. The second embodiment provided by the present invention has an advantage of triggering the type 1b transmission regardless of a type of the control channel. According to the provided second embodiment, the full uplink bandwidth may be uniformly used for the channel measurement due to a characteristic of different (random) start positions of the control channel for respective UEs.

Further, there is an advantage of controlling the transmission bandwidth used for the type 1b SRS transmission in consideration of the channel state of the UE which has been already reflected in the control channel transmission.

Figure 8:
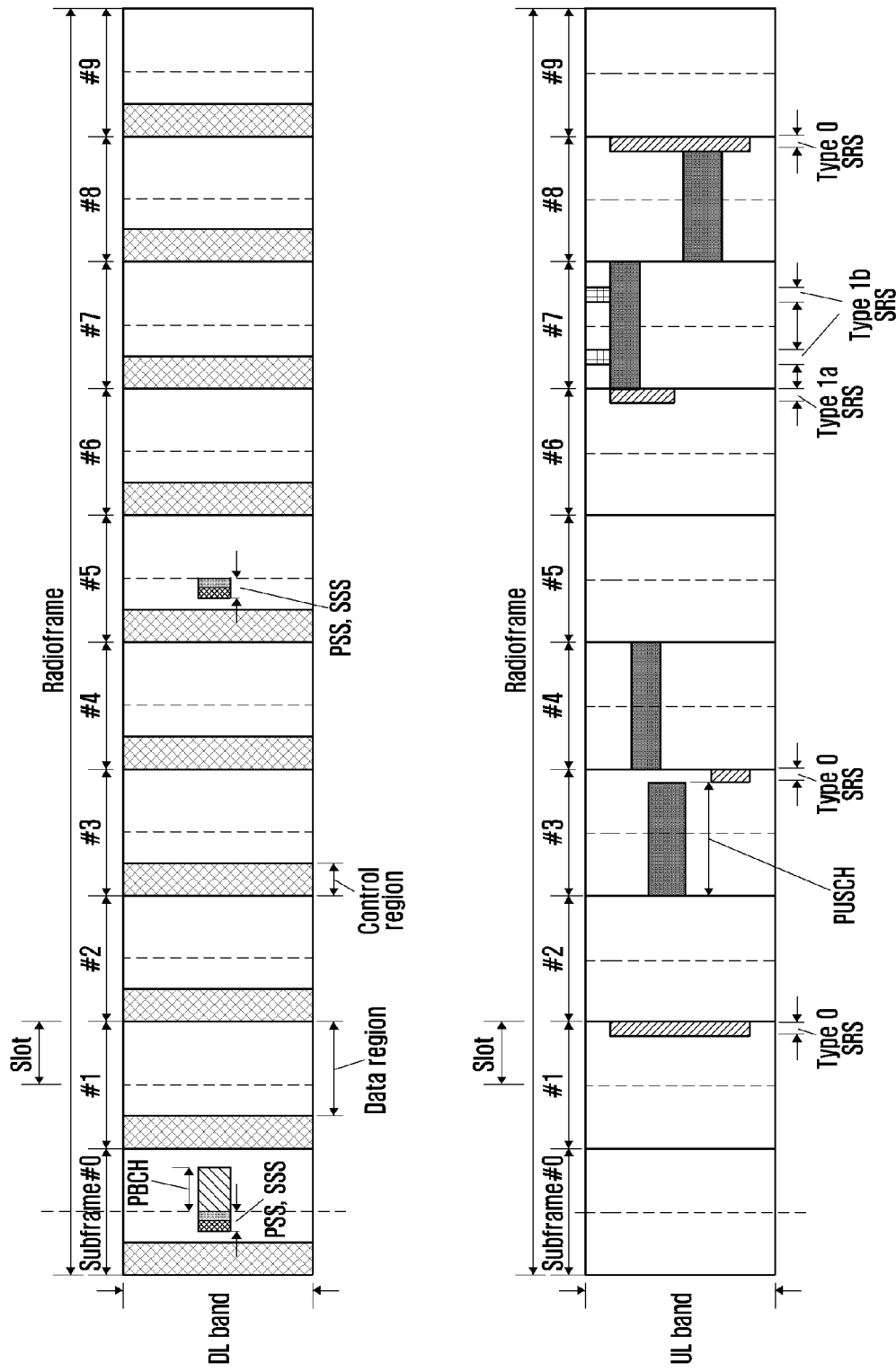
FIG. 8 illustrates a method of transmitting a channel SRS according to a third embodiment of the present invention.

FIG. 8 illustrates a method of transmitting an RS for measuring a channel according to a third embodiment of the present invention.

The third embodiment provides a method of transmitting the data channel and the sounding RS through one carrier on the band contiguous with the uplink data channel by using uplink control information. The method of the third embodiment shown in FIG. 8 only increases a bandwidth of DMRS transmission in a signal transmitting one data channel cluster.

It is easier to guarantee orthogonality between UEs in the DMRS in comparison with the data channel, so that the DMRS bandwidth can be increased. In this circumstance, the data channel uses the bandwidth scheduled by the control channel without any change. In contrast, in a case of the DMRS, the bandwidth indicated by the data channel may be increased n times in a direction of a higher frequency index. In the DMRS transmission, the bandwidth does not necessarily have to be increased in the direction of the higher frequency index, and the bandwidth may be increased n times in a direction of a lower frequency index or the transmission bandwidth may be preset by higher layer signaling for the UE.

Figure 9:
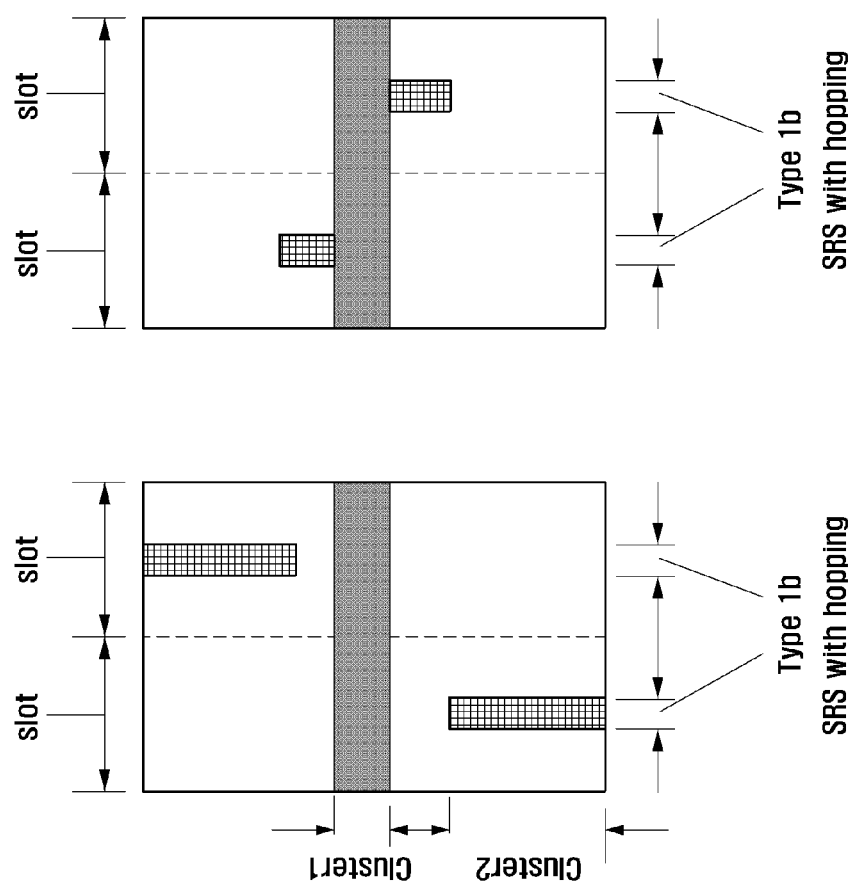
FIG. 9 illustrates a method of transmitting a channel SRS according to a fourth embodiment of the present invention.

FIG. 9 illustrates a method of transmitting an RS that supports hopping between slots in a method of transmitting an RS for measuring a channel according to a fourth embodiment of the present invention.

Referring to FIG. 9, since the SRS transmission of type 0 and type 1a are performed using the last symbol of the uplink subframe, the SRS transmission of type 0 and type 1a can be performed only once for a whole subframe duration. However, according to the present invention, since the SRS transmission using the DMRS can be performed using two slots existing in the subframe, two transmissions can be made. The DMRS does not have interference between UEs if the UEs use different cyclic shifts, so that the BS can receive the corresponding transmission even though the DMRS transmission of the UE hops between slots. Further, when the hopping is used for the DMRS transmission, the BS may measure the uplink band twice by only one channel SRS transmission instruction, and transmission efficiency may double in comparison with the type 0 and type 1a SRS transmissions.

Figure 10:
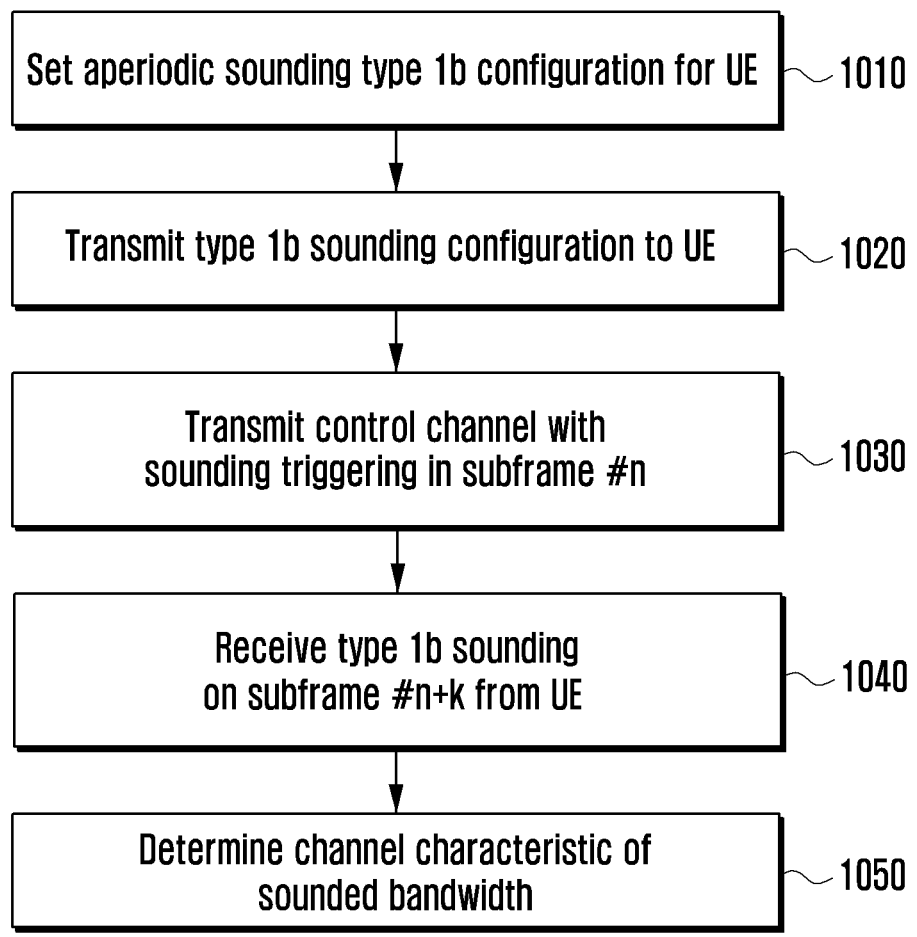
FIG. 10 illustrates an operation of a BS according to an embodiment of the present invention.

FIG. 10 is a flowchart illustrating a method of operation for a BS to perform multi-cluster transmission on the channel SRS based on the aperiodic DMRS and the data channel in accordance with an embodiment of the present invention.

Referring to FIG. 10, in step 1010, the BS sets or establishes a type 1b transmission configuration corresponding to aperiodic channel SRS transmission for a UE, in accordance with an embodiment of the present invention.

Thereafter, the BS transmits the type 1b configuration to the UE through higher layer signaling in step 1020.

In step 1030, the BS indicates, through the control channel, that the UE is to perform type 1b transmission in accordance with embodiments of the present invention. In step 1040, the BS receives a channel SRS from the UE by using previously scheduled type 1b transmission information. In step 1050, the BS measures channel characteristics of the measured channel.

Figure 11:
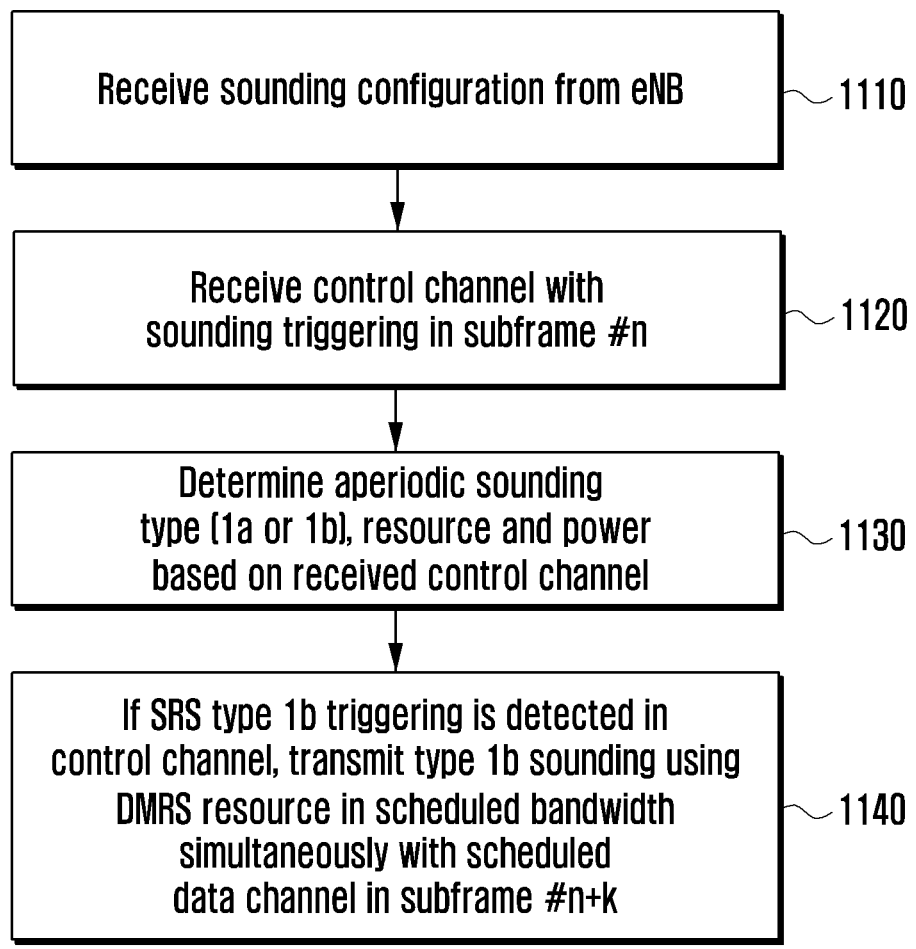
FIG. 11 illustrates an operation of a UE according to an embodiment of the present invention.

FIG. 11 is a flowchart illustrating a method of operation for a UE to perform multi-cluster transmission on the channel SRS based on aperiodic DMRS and data channel, in accordance with an embodiment of the present invention.

Referring to FIG. 11, the UE receives configuration information for the channel SRS transmission from the BS in step 1110. Subsequently, the UE receives the control channel including scheduling information in which the SRS transmission is triggered at subframe #n in step 1120. In step 1130, the UE analyzes information on an aperiodic SRS type, resources, and power based on the received control channel.

In step 1140, when the UE detects the triggering of type 1b SRS transmission in the control channel, the UE transmits a type 1b SRS by using the DMRS resource at subframe #n+k. In this circumstance, a channel and a data channel for the SRS are included in the detected control channel explicitly or implicitly.

Figure 12:
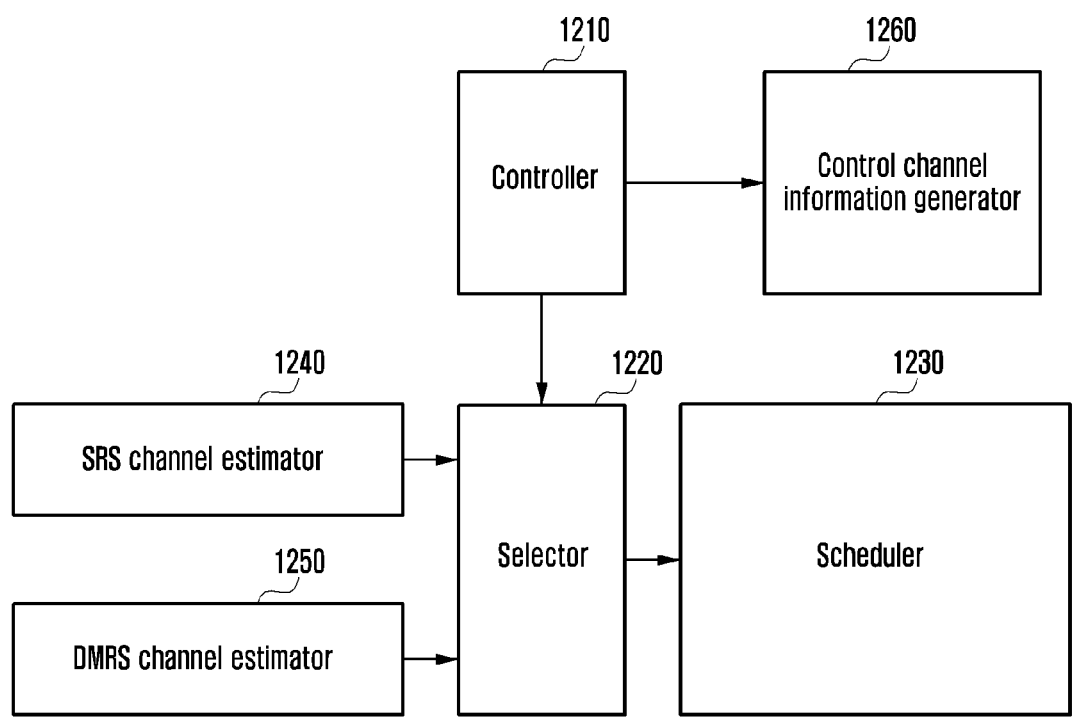
FIG. 12 illustrates a BS device according to an embodiment of the present invention.

FIG. 12 is a block diagram illustrating an internal structure of a BS device for interference cancellation transmission in accordance with an embodiment of the present invention.

Referring to FIG. 12, a BS controller 1210 configures control channel information for simultaneously scheduling a sounding cluster and a data transmission cluster in the multi-cluster transmission in accordance with an embodiment of the present invention through a control channel information generator 1260 and transmits the configured control channel information to the UE. Further, the BS controller 1210 configures and transmits system information for type 1b SRS transmission to the UE. In addition, the BS controller 1210 selectively uses a channel estimator according to the channel measurement method which the BS provides to the UE, that is, type 0 transmission, type 1a transmission, and type 1b transmission. When the type 0 transmission and the type 1a transmission are indicated to the UE, the BS controller 1210 performs the channel measurement by using an SRS channel estimator 1240. When the type 1b transmission is indicated to the UE, the BS controller 1210 selects channel information generated by a DMRS channel estimator 1250 through a selector 1220, transmits the selected channel information to a scheduler 1230, and uses the channel information for scheduling of the uplink data channel of the UE.

More specifically, the BS controller 1210 generates a control channel for uplink data channel transmission of the UE and transmits the generated control channel to the UE. Further, when the control channel includes information for aperiodic channel SRS transmission of the UE, the BS controller 1210 receives uplink data from the UE through a first carrier and the channel SRS through a second carrier, and controls to measure a channel state by using the received channel SRS.

Figure 13:
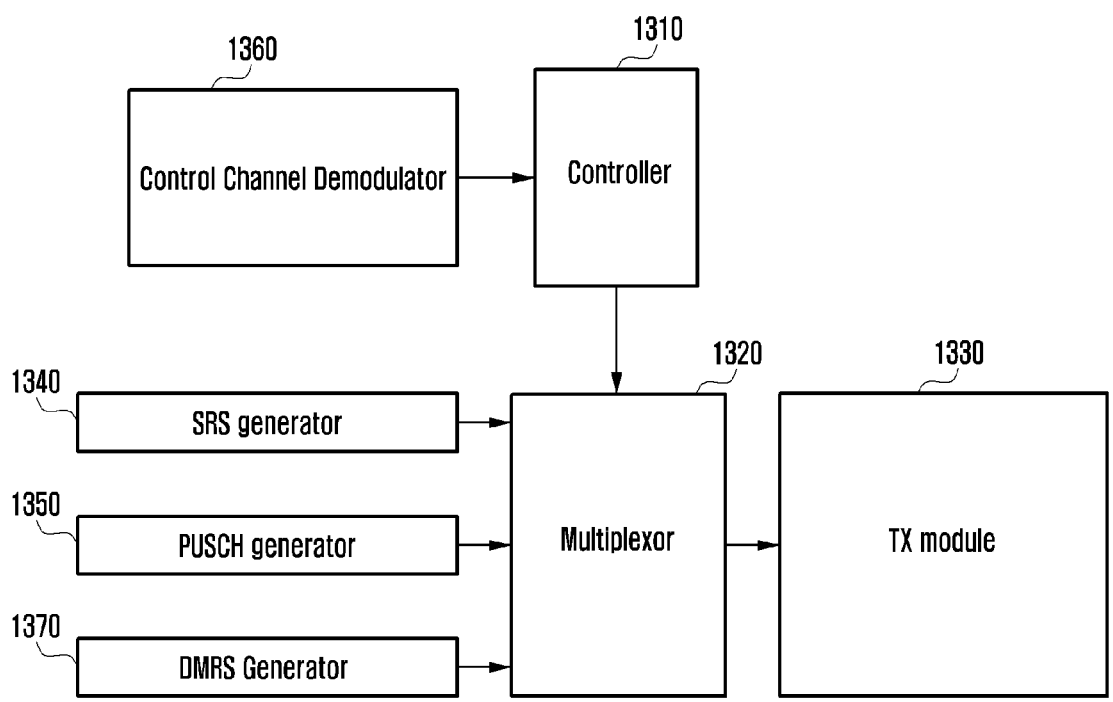
FIG. 13 illustrates a UE device according to an embodiment of the present invention.

FIG. 13 is a block diagram illustrating an internal structure of a UE device which transmits a channel SRS in accordance with an embodiment of the present invention.

Referring to FIG. 13, a UE controller 1310 recognizes control channel information of a control channel received from the BS through a control channel demodulator 1360. The UE configures a signal for transmitting an RS to measure an uplink channel by using the recognized control channel.

When the BS instructs the UE to transmit a channel SRS of type 1a, the UE controller 1310 generates a signal through an SRS generator 1340. In this circumstance, when there is data to be transmitted, the data and the data channel are time division multiplexed by a multiplexor 1320, and then transmitted to the BS by a transmission (TX) module 1330.

When the BS instructs the UE to transmit the channel SRS of type 1b, the UE controller 1310 generates a data channel by using a data channel generator (PUSCH generator) 1350 and a DMRS generator 1370, controls the multiplexor 1320 to frequency division multiplex DMRSs for the data channel and the channel measurement by using resource allocation information indicated by the BS, and controls the TX module 1330 to transmit the DMRSs to the BS.

More specifically, the UE controller 1310 receives a control channel for uplink data channel transmission from the BS and determines whether the received control channel includes information for aperiodic channel SRS transmission. When the control channel includes aperiodic channel SRS transmission information, the UE controller 1310 controls the UE such that uplink data is transmitted through a first carrier and the channel SRS is transmitted through a second carrier.

The UE controller 1310 according to an embodiment of the present invention determines whether to perform the aperiodic channel SRS transmission based on the multi-cluster flag indicating a number of uplink carriers and the SRS transmission indicator indicating SRS transmission trigger included in the control channel.

Precoding information included in the control channel is used only for uplink data transmission and is not used for channel SRS transmission.

The UE controller 1310 compares a sum of the power used for transmission of the RS for data channel demodulation and the power used for the channel SRS transmission with maximum transmission power of the UE. When the maximum transmission power is larger than the sum, the UE controller 1310 makes a setting such that the same power is used for both the transmission of the RS for the data channel demodulation and the transmission of the channel SRS. When the maximum transmission power is smaller than the sum, the UE first allocates power to the transmission of the RS of the data channel demodulation and then allocates power as required for the channel SRS transmission.

According to embodiments of the present invention, the data channel and orthogonality are always maintained regardless of the existence of, and/or transmission on, the data channel of another UE within the same cell, and thus the data channel capacity of the other UEs in the cell can be maintained. Furthermore, embodiments of the present invention can be implemented on conventional systems without any substantial change since no additional information is needed on the control channel.

Embodiments of the present invention disclosed in the present specification and the accompanying drawings are just specific examples for easily describing the technical contents and helping understanding of the present invention, but the present invention is not limited thereto. It would be obvious to those skilled in the art to which the present invention pertains that other modifications, additions, and changes may be made in order to implement other embodi-

What is claimed is:

1. A method for User Equipment (UE) in a wireless communication system to transmit a channel Sounding Reference Signal (SRS), the method comprising:
    receiving a control channel for transmitting an uplink data channel transmission from a Base Station (BS), wherein the control channel comprises information indicating whether the UE transmits the channel SRS simultaneously with the uplink data in a subframe;
    determining whether aperiodic channel SRS transmission is requested in the control channel; and
    when it is determined that the aperiodic channel SRS transmission is requested in the control channel, and the information indicates transmitting the channel SRS simultaneously with the uplink data in the subframe:
    transmitting the uplink data through a first carrier in the subframe to the BS; and
    transmitting the channel SRS through a second carrier in the subframe to the BS simultaneously with transmitting the uplink data,
    wherein a resource location in the subframe for the transmission of the channel SRS is determined based on the control channel.

2. The method of claim 1, wherein the information indicating whether the UE transmits the channel SRS simultaneously with the uplink data comprises a multi-cluster flag indicating a number of uplink carriers and an SRS transmission indicator indicating an SRS transmission trigger.

3. The method of claim 1, wherein precoding information included in the control channel is used only for transmitting the uplink data and is not used for transmitting the channel SRS.

4. The method of claim 1, wherein the transmitting uplink data comprises:
    comparing a maximum transmission power of the UE with a sum of power used for transmitting a reference signal for data channel demodulation and power used for transmitting the channel SRS;
    making, when the maximum transmission power of the UE is larger than the sum, a setting such that equal power is used for transmitting the reference signal for the data channel demodulation and transmitting the channel SRS; and
    making, when the maximum transmission power of the UE is smaller than the sum, a setting such that power is first allocated for transmitting the reference signal for the data channel demodulation and reducing the power for transmitting the channel SRS.

5. A User Equipment (UE) for transmitting a channel Sounding Reference Signal (SRS) in a wireless communication system, comprising:
    a transceiver configured to transmit a signal to a Base Station (BS) and to receive a signal from the BS, wherein a control channel comprises information indicating whether the UE transmits the channel SRS simultaneously with an uplink data in a subframe; and
    a controller configured:
    to control reception of the control channel for transmitting the uplink data channel transmission from the BS,
    to determine whether aperiodic channel SRS transmission is requested in the control channel, and
    when the aperiodic channel SRS transmission is requested in the control channel and the information indicates transmitting the channel SRS simultaneously with the uplink data in the subframe, to control transmission of the uplink data through a first carrier in the subframe to the BS, and to control transmission of the channel SRS through a second carrier in the subframe to the BS simultaneously with the transmission of the uplink data,
    wherein a resource location in the subframe for the transmission of the channel SRS is determined based on the control channel.

6. The UE of claim 5, wherein the information indicating whether the UE transmits the channel SRS simultaneously with the uplink data comprises a multi-cluster flag indicating a number of uplink carriers and an SRS transmission indicator indicating SRS transmission trigger.

7. The UE of claim 5, wherein precoding information included in the control channel is used only for transmission of the uplink data and is not used for transmission of the channel SRS.

8. The UE of claim 5, wherein the controller compares maximum transmission power of the UE with a sum of power used for transmission of a reference signal for data channel demodulation and power used for transmission of the channel SRS, makes a setting, when the maximum transmission power is larger than the sum, such that equal power is used for the transmission of the reference signal for the data channel demodulation and the transmission of the channel SRS, and makes a setting, when the maximum transmission power of the UE is smaller than the sum, such that power is first allocated to the transmission of the reference signal for the data channel demodulation and power required for the transmission of the channel SRS is reduced.

9. A method for a Base Station (BS) to control transmission of a channel Sounding Reference Signal (SRS) from User Equipment (UE) in a wireless communication system, comprising:
    generating a control channel for transmitting an uplink data of the UE, wherein the control channel comprises information indicating whether the UE transmits the channel SRS simultaneously with the uplink data in a subframe;
    transmitting the generated control channel to the UE;
    when aperiodic channel SRS transmission is requested in the control channel and the information indicates transmitting the channel SRS simultaneously with the uplink data in the subframe, receiving the uplink data through a first carrier in the subframe from the UE and receiving the channel SRS through a second carrier in the subframe from the UE simultaneously with the receiving the uplink data; and
    measuring a channel state by using the received channel SRS,
    wherein a resource location in the subframe for the transmission of the channel SRS is determined based on the control channel.

10. The method of claim 9, wherein generating the control channel comprises:
    generating the control channel having a multi-cluster flag indicating a number of uplink carriers and an SRS transmission indicator indicating SRS transmission trigger, wherein the UE determines whether to perform the aperiodic channel SRS transmission based on the multi-cluster flag and the SRS transmission indicator.

11. A Base Station (BS) for controlling transmission of a channel Sounding Reference Signal (SRS) from User Equipment (UE) in a wireless communication system, comprising:
- a transceiver configured to transmit a signal to a UE and to receive a signal from the UE; and
- a controller configured:
- to control generation of a control channel for transmitting an uplink data of the UE, to control transmission of the generated control channel to the UE, wherein the control channel comprises information indicating whether the UE transmits the channel SRS simultaneously with the uplink data in a subframe,
- to control, when aperiodic channel SRS transmission is requested in the control channel and the information indicates transmitting the channel SRS simultaneously with the uplink data in the subframe, reception of the uplink data through a first carrier in the subframe from the UE, and reception of the channel SRS through a second carrier in the subframe from the UE simultaneously with the reception of the uplink data, and
- to control measurement of a channel state by using the received channel SRS,
- wherein a resource location in the subframe for the transmission of the channel SRS is determined based on the control channel.

12. The BS of claim 11, wherein the control channel is generated having a multi-cluster flag indicating a number of uplink carriers and an SRS transmission indicator indicating SRS transmission trigger, and the UE determines whether to perform the aperiodic channel SRS transmission based on the multi-cluster flag and the SRS transmission indicator.

\* \* \* \* \*